March 28, 1950
J. E. ANDERSON
2,501,656
SAWHORSE CLAMP
Filed May 24, 1946
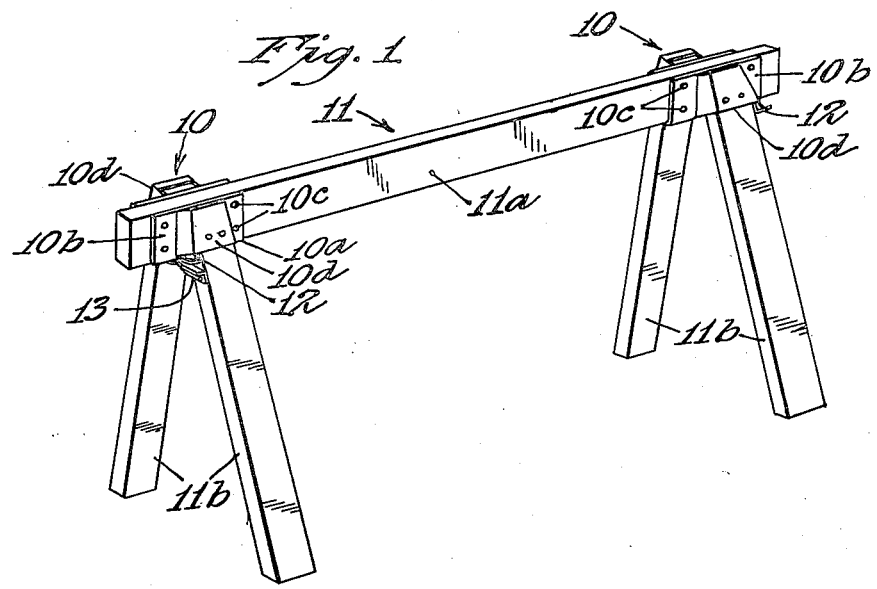
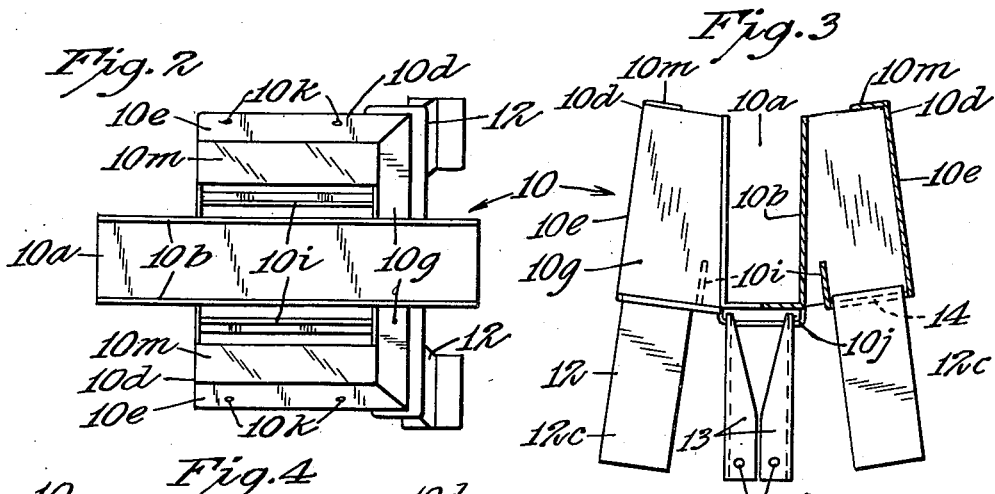
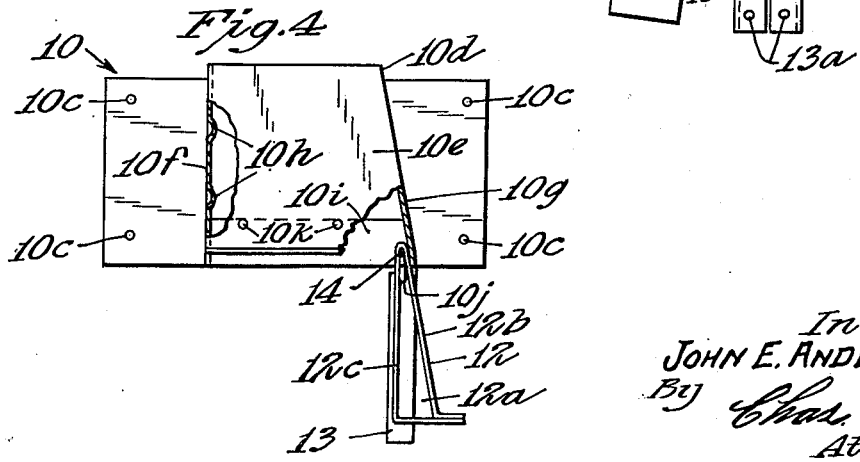
Inventor
JOHN E. ANDERSON
By Chas. E. Reif
Attorney Patented Mar. 28, 1950

2,501,656

UNITED STATES PATENT OFFICE 2,501,656

SAWHORSE CLAMP

John E. Anderson, Minneapolis, Minn.

Application May 24, 1946, Serial No. 671,991

8 Claims. (Cl. 304—5)

This invention relates to a device for constructing a scaffolding support or horse. Such a horse commonly comprises a top-supporting member extending longitudinally thereof and a pair of leg members adjacent each end of said top member, the legs of each pair being secured to said top member at their upper ends and diverging downwardly.

It is an object of this invention to provide a simple and efficient device for holding the top member and the leg members and securing them tightly in position.

It is a further object of the invention to provide such a device comprising a central channel member open at its upper side and adapted to receive the top member of said support, casings extending outwardly from each side of said channel member, said casings being open at their bottoms and adapted to receive the upper ends of said legs, together with wedges carried by said device and adapted to be driven along one side of each leg respectively to clamp said leg between said wedge and one end wall of said casing.

It is a further object of the invention to provide such a device as set forth in the preceding paragraph, together with members movably connected thereto and adapted to be positioned against the ends of said wedges when in clamping position and to be secured to said legs to hold said wedges in clamping position.

It is more specifically an object of the invention to provide a device comprising a central channel member open at its upper side and adapted to receive the top member of said horse, casings extending outwardly at each side of said channel having end walls and outer side walls which diverge downwardly respectively and thus extend at an angle to the sides of said channel, said casings being open at their lower sides and adapted to receive the upper ends of the legs of said horse, one of said end walls extending at an angle to the vertical and downwardly away from the other end wall, wedges carried by said device and adapted to be driven upwardly against one side of the legs respectively, said wedges having their inclined sides adjacent the end wall which is inclined to the vertical and clamping said legs between said wedges and the other end wall.

It is also an object of the invention to provide such a device as set forth in the preceding paragraph, together with members swingingly connected thereto and adapted to be positioned against the ends of said wedges when in clamping position, said members having holes through which nails can be driven into said legs and thus hold said wedges in clamping position, said channel member and casings having openings through which nails can be driven into the top member of said support and said legs respectively.

These and other objects and advantages of the invention will be fully set forth in the following description made in connection with the accompanying drawings in which like reference characters refer to similar parts throughout the several views and in which:

Fig. 1 is a perspective view of a scaffolding support or horse embodying the present invention;

Fig. 2 is a top plan view of the device of this invention;

Fig. 3 is a view in end elevation, some parts being broken away and others shown in vertical section; and Fig. 4 is a view in side elevation of said device, some parts being broken away and others shown in vertical section.

Referring to the drawings, a device 10 is shown which comprises a central channel member 10a, the sides 10b of which extend vertically and said channel member is open at its upper side. Channel member 10a is adapted to receive the top member 11a of a scaffolding support or horse 11. Said top member 11a is usually made of a timber, such as a 2 x 4, and the same substantially fits in the channel 10a. The walls 10b are provided with a plurality of holes 10c adjacent their ends through which nails may be driven into member 11a to secure member 10 thereto. Projecting outwardly from each side wall 10b of channel 10a is a casing 10d. Casings 10d have outer side walls 10e and in the embodiment of the invention illustrated, these walls respectively diverge downwardly and are thus at an angle to the sides of channel 10a. Casings 10d have end walls making a right angle with the sides of channel 10a, one of which end walls 10f extends vertically and the other end wall 10g is inclined to the vertical and extends downwardly away from end wall 10f. End wall 10f has protuberances 10h formed on its inner side adapted to bite into or press into the leg of the support or horse when the same is clamped thereagainst. A pin 14 extends between the outer side wall 10b of each of said casings and a partition 10i adjacent the bottom of said casing. Partitions 10i are of comparatively narrow width and extend between the end walls of casings 10d, said partitions having their lower sides flush with the lower sides of side walls 10e. A wedge 12 is provided for each casing 10d and said wedges have openings 12a extending longitudinally thereof throughout most of their length and the pins 14 extend respectively through the openings 12a. Said wedges are thus of hollow formation, each having a plate-like side 12c and an inclined side 12b which is adjacent the inclined end wall 10g of casing 10d. A pair of members 13 are provided, the same being connected to the device as by having apertured ends through which passes a staple-like projection or bail 10j secured to the bottom of channel member 10a. While members 13 could be variously formed, in the embodiment of the invention illustrated they are shown as in the form of angles. Members 13 have holes 13a adjacent their free ends. The casings 10d also have holes 10k through the outer walls 10e adjacent the bottoms thereof. Casings 10d also have top walls 10m which extend inwardly from the outer sides 10e substantially halfway to the sides of channel 10a. There is thus an opening through the top of casings 10d.

In operation, when the support or horse 11 is to be constructed, the top member or timber 11a will be placed in two of the members 10, as shown in Fig. 1. Nails can then be driven through holes 10c to secure members 10 to the timber 11a. The legs 11b of the support will now be inserted in the casings 10d successively and these legs will pass upward between partitions 10i and the outer walls 10e. They can be moved upwardly until they strike the top wall portion 10m. When the leg has been so inserted in a casing 10d, a corresponding wedge 12 will then be driven upwardly. The inclined side of the wedge will move along the inclined side 10g of the casing and the straight side of the wedge will thus be pressed against one side of leg 11b and said leg will be forced against the wall 10f. The leg will thus be very securely clamped in position and the protuberances 10h will press into the leg thus assuring that it will be securely held. Nails can be driven through the holes 10k to further insure that the leg will be firmly held in position. After the legs have been so inserted and wedges 12 driven into place, the members 13 can be swung outwardly along one side of legs 11b into contact with the lower ends of wedges 12. A nail will then be driven through the hole 13a into leg 11b. The wedge 12 is now prevented from any downward movement by member 13. The legs 11b are usually made of 2 x 4 timbers. While members 10 could be variously made, in practice they have been made of sheet steel and are thus quite light in weight. Obviously they can also be made of aluminum or other metal.

From the above description it will be seen that I have provided a very simple and highly efficient device for constructing a scaffolding support or horse. The horse can be very quickly made and with very little effort or labor. When constructed, the horse is very strong and rugged. The device has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for constructing a scaffolding support or horse having in combination, a member comprising a central channel open at its upper side and adapted to receive the top of said horse, a casing extending from each side of said channel, said casings being open at their bottoms and adapted to receive the upper ends of the legs of said horse and having outer sides which diverge downwardly respectively to thus extend at an angle to the sides of said channel, and a wedge carried by each casing adapted to be driven upwardly between one end of each casing and one side of said legs respectively to clamp said legs between said wedge and the other end of said casing.

2. The structure set forth in claim 1, a pin extending across each of said casings, said wedges having an opening therethrough extending longitudinally thereof through which said pin passes whereby said wedges are secured to said casings and move relatively to said pin when driven upwardly to clamping position.

3. The structure set forth in claim 1, and means carried by each of said casings for engaging the end of the wedge of said casing when in clamping position and adapted to be secured to one of said legs to hold said wedge in clamping position.

4. The structure set forth in claim 1, a partition extending between the end walls of each of said casings adjacent the bottom thereof and parallel to the outer side wall.

5. A device for constructing a scaffolding support or horse having in combination, a member having a central channel open at its upper side and adapted to receive the top timber of said support, casings extending outwardly from the sides of said channel, said casings having outer side and end walls, one of said end walls being inclined to the vertical and extending downwardly away from the other end wall, said casings being open at their bottoms and adapted to receive the upper ends of the legs of said support, wedges movably carried by said casings and each having its inclined side adjacent to said one end wall respectively and adapted to be driven against one side of said legs to clamp the same between the other end wall of said casing and said wedge.

6. The structure set forth in claim 5, members swingingly connected to said casings and adapted to be positioned against the ends of said wedges respectively when in clamping position, said members having holes through which a nail can be driven into said leg to hold said wedge in clamping position.

7. The structure set forth in claim 1, a partition extending between the end walls of each of said casings adjacent the bottom thereof and parallel to the outer side wall, a pin extending from said partition to said outer side wall, said wedge having an elongated opening extending transversely therethrough which said pin passes whereby said wedge is connected to said casing.

8. The structure set forth in claim 1, said wedges being formed of a strip of material rectangular in cross section and reversely bent upon itself and having its end portions in engagement at the wider end of said wedge whereby said wedge has an opening extending transversely therethrough between the portions of said strip and means secured to each of said casings passing through said opening in said wedge to connect said wedge to said casing and yet permit the driving function of said wedge.

JOHN E. ANDERSON.

REFERENCES CITED

The following references are of record in the file of this patent:

UNITED STATES PATENTS

| Number | Name | Date |
| --- | --- | --- |
| 461,331 | Graves | Oct. 13, 1891 |
| 802,834 | Upthegrove | Oct. 24, 1905 |
| 1,612,517 | Lampert | Dec. 28, 1926 |
| 1,996,761 | Gould et al. | Apr. 9, 1935 |
| 2,105,979 | Manley | Jan. 18, 1938 |